United States Patent [19]
Bellah et al.

[11] 3,744,175
[45] July 10, 1973

[54] TRAVELING FISHING LURE

[76] Inventors: Lester R. Bellah, 11821 Otsego, North Hollywood; William H. Bellah, 4118 Beethoven, Los Angeles, both of Calif.

[22] Filed: Feb. 19, 1971

[21] Appl. No.: 116,899

[52] U.S. Cl............... 43/42.39, 43/42.48, 43/42.49
[51] Int. Cl............................................. A01k 85/00
[58] Field of Search...................... 43/42.39, 42.48, 43/42.47, 42.49

[56] References Cited
UNITED STATES PATENTS

| | | | |
|---|---|---|---|
| 1,321,850 | 11/1919 | Rhodes.............................. | 43/42.39 |
| 3,133,372 | 5/1964 | Born................................. | 43/42.39 |
| 2,557,516 | 6/1951 | Schipper........................... | 43/42.39 |
| 3,363,359 | 1/1968 | Oney................................. | 43/42.47 |
| 3,401,483 | 9/1968 | Bellah et al....................... | 43/42.47 |

*Primary Examiner*—Warner H. Camp
*Attorney*—Lyon & Lyon

[57] ABSTRACT

The invention relates to a fishing lure having a planing surface and a particular weight distribution associated with the fishing line attachment, the lure having a slightly negative buoyancy. In both embodiments shown herein, the lure normally tends to sink slowly in the water but when the line is jerked sharply, the lure makes a steep ascent in a curved path toward the surface of the water so that when the line is released and allowed to play out, the lure will continue its curved path due to its momentum and will travel away from the fisherman to a distance beyond the initial position from which it was moved to cause its initial motion.

3 Claims, 5 Drawing Figures

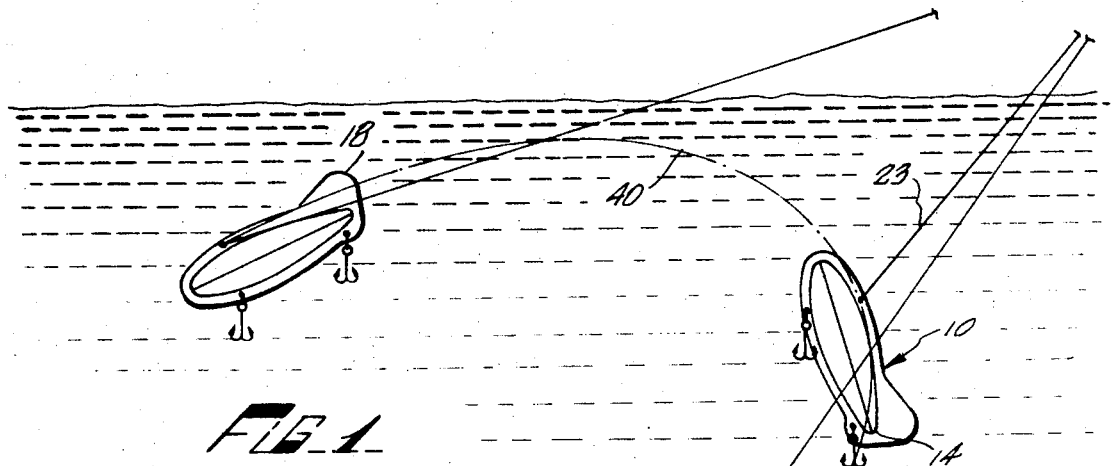
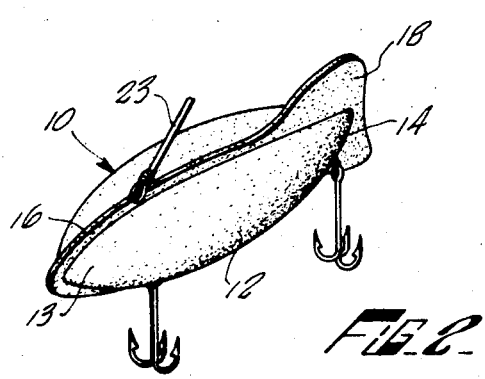
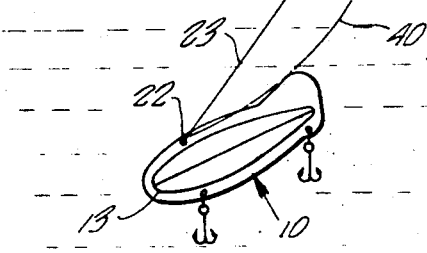
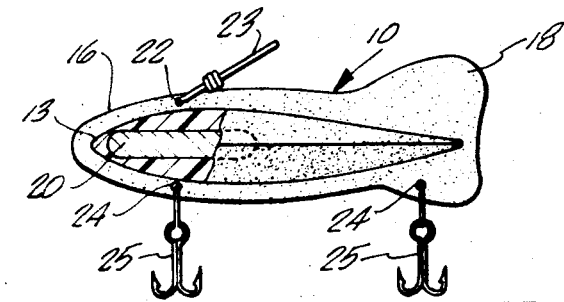
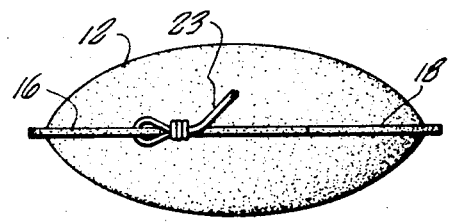
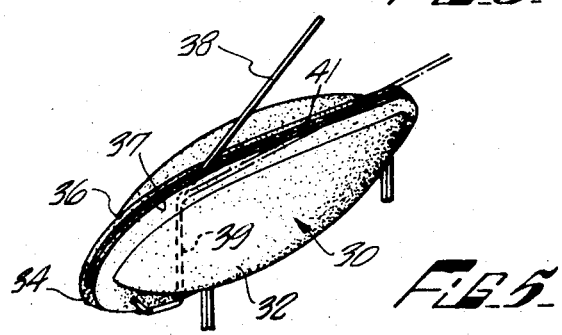

TRAVELING FISHING LURE

BACKGROUND OF THE INVENTION

A number of fishing lures are known which are provided with various types of diving planes or peculiar weight distributions so that the lure will obtain a desired position in the water when the lure is pulled through the water. Most of such devices are trolling lures with diving planes so oriented that the lure will submerge as it is pulled. Of those lures which are called traveling lures, our previously issued U.S. Pat. No. 3,401,483 discloses a lure which travels away from the fisherman because of its buoyancy and the weight distribution peculiar thereto. This device, however, is more accurately a bobber having a positive buoyancy and the device travels away from the fisherman because as the fishing line is pulled toward the fisherman the lure submerges sharply and then when the line is released the buoyancy of the device causes it to ascend to the surface at a more gradual angle than it dives thereby moving farther away from the fisherman than it was initially.

While our previous invention provides a good traveling lure, it is of the bobber type which means that it normally floats on the surface. Bobbers are good for certain types of fishing but other fishing lures which are disposed beneath the surface at or near the bottom are desirable for other types of fishing.

SUMMARY OF THE INVENTION

The present invention provides a lure which can be made to travel away from the fisherman but which does not float upon the surface. The device has curved planes or planing surfaces as well as fins to control the direction of its movement through the water. The device may be made from any suitable material, plastic being the preferred material and it is weighted towards the front end thereof so that it will assume a generally nose-downward orientation in the water and will tend to sink slowly. The fishing line is attached toward the front ahead of the center of gravity so that when the line is jerked toward the fisherman, the nose of the lure will be pulled upwardly causing the lure to tend to move toward the surface of the water. The shape and disposition of the planing surfaces is such that the lure will travel in a curved path through the water. Before the lure reaches the surface, the fisherman will pay out some fishing line and the curved path of the lure will continue and its momentum will cause the lure to move away from the fisherman as additional line is paid out. The fins provided on the lure will operate during this movement of the lure to tend to cause the lure to move in a straight path away from the fisherman.

It is an object, therefore, of the present invention to provide a fihsing lure which can be made to travel away from the fisherman.

More specifically, it is an object of the present invention to provide a fishing lure which is propelled away from the fisherman due to momentum imparted thereto by the fisherman by jerking it rearwardly which imparts to the lure a curved path.

It is a further object of the present invention to provide a traveling fishing lure which can be made to travel away from the fisherman in a substantially straight path regardless of how the lure might become oriented in the water before the fisherman jerks upon it to impart to it the aforementioned curved path of motion.

The fishing lure may also be provided with appropriate marking or dressing to simulate a fish and is provided with one or more hooks as desired. The device can be made from various materials and in various sizes.

DESCRIPTION OF THE DRAWINGS

FIG. 1 is a diagrammatic view showing the manner in which the lure travels when acted upon in the way described.

FIG. 2 is a perspective view of the lure shown in FIG. 1.

FIG. 3 is a partially sectioned side elevation of the lure shown in FIG. 2.

FIG. 4 is a plan view of the lure shown in FIG. 2.

FIG. 5 is a perspective view of another embodiment of the lure in which the fins have been altered slightly for improved directional stability.

DESCRIPTION OF THE INVENTION

Referring in detail to the drawings, the device 10 in FIGS. 1 through 4 comprises a somewhat lenticular or double-convex yet flat ellipsoidal body 12 having a nose 13 and a tail 14. The cross-sectional aspect of the body 12 is non-symmetrical (FIG. 3), the thickness of the body being at its maximum near the nose 13, or about one-third of the distance from the nose to the tail. This gives the body a somewhat tear-like hydrodynamic shape so that the lateral sides will act as planing surfaces when the lure travels nose-first through the water. A dorsoventral rib 16 extends along the longitudinal central axis of the body 12 and is provided with an enlarged tail fin 18. As shown in FIG. 3, in section, a weight 20 is disposed within the interior of the body 12 near the nose 13. A line eyelet 22 is provided in the rib 16 at a point approximately above and somewhat ahead of the center of gravity of the device 10 to which a fishing line 23 may be secured. On the lower portion of the rib 16 are one or more hook eyelets 24 to which hooks 25 may be secured.

An alternative embodiment of the present invention is shown in FIG. 5 wherein the device 30 is likewise comprised of an ellipsoid body 32 of cross-sectional shape similar to body 12, but in this configuration, the dorsoventral rib 34 is comprised of two parallel plates 36 and 37 and the fishing line 38 extends between those plates in slot 41 through a bore 39 extending through the body 32 and is attached to the ventral portion of the rib. As will be seen in describing the sequence of events occurring as shown in FIG. 1, it will be noticed that when the lure is proceeding away from the fisherman, the line 38 will be entrained in slot 41 between the plates 36 and 37, as shown in phantom lines in FIG. 5, so that the lure is at once aligned with the fishing line and thereby tends to proceed directly away from the fisherman.

Turning now to FIG. 1, the lure 10 shown in the lowermost position is in its quiescent state wherein the nose 13 is aimed slightly downwardly and the lure will tend to sink slowly in the water. In the next position in FIG. 1, the lure 10 is shown after the line 23 has been jerked rearwardly. Because of the position of the line eyelet 22 and the location of the weight 20 in the body the rearward jerking on the line 23 will cause the tail 14 to drop but there will remain an upward pulling upon the device causing it to flip over backwardly. Here the lure starts to move upwardly toward the surface of the water and now the curved surfaces of the body 12 act as planes to impart to the device a curved path generally along the dotted line 40. This curved path will continue as the rearward tension is applied until the device is approximately in the median position shown in FIG. 1, whereupon the tension in the line 23 is relaxed and the line allowed to pay out, whereupon the device will continue to follow the arch of dotted line 40 and because of the peculiar disposition of the weight within the body 12, the nose will again tend to assume a downward position but due to the momentum imparted to the lure and the action of the planing surface, the lure will tend to continue to move forwardly but slightly downwardly due to the slightly nose-heavy condition. Thus, the lure will tend to travel outwardly away from its initial position pulling the line out as it goes. The tail fin 18 will tend to keep the lure traveling in a straight line and when the lure is traveling after the line is relaxed and being payed out, the line will lay along the side of the tail fin 18 as seen in FIG. 1 thereby further controlling the direction of travel since the line will be acting upon the tail fin to straighten its course.

As previously mentioned, in the alternate embodiment, as the lure moves away from the fisherman, the line 38 will become aligned in the groove between ribs 36 and 37 thereby further imparting direction to the path of travel of the lure. It is also obvious that with the line positioned between the ribs 36 and 37, pulling upon the line or jerking upon it as previously described will straighten it out with respect to a line drawn through the lure and extending to the position of the fisherman even though the lure may have been allowed to become misaligned. Other modifications or alterations of the present invention will occur to those skilled in the art.

We claim:

1. A traveling fishing lure, comprising:
    a flat, ellipsoidal body having a longitudinal major axis with a nose end and a tail end, said body including laterally extending planing members on each side of said major axis, said planing members being tapered in the lateral direction outwardly toward the edges thereof, said planing members having upper and lower curved surfaces defining a vertical longitudinal cross section which is tear-shaped;
    a weight disposed within said body, said weight being situated near the nose end of said body, said weight establishing a center of gravity for said lure which is located between the geometric center of said major axis and said nose end;
    a dorsoventral rib mounted upon said body, said rib providing means for guiding the movement of said lure through the water; and
    means on said lure for attaching a fishing line thereto, said attaching means being located between the center of gravity of said lure and the nose end of said body.

2. A fishing lure of the type set forth in claim 1, wherein said dorsoventral rib comprises a pair of parallel plates separated to define a slot therebetween, said slot having an open upper edge, said slot running along the upper side of said body aligned with said major axis and extending substantially the entire length thereof;
    said attaching means being located between said plates at a point intermediate the center of gravity of said lure and the nose end of said body whereby said slot is adapted to receive a fishing line therein to guide the direction of movement of said lure in the water.

3. A traveling fishing lure, comprising:
    a flat, ellipsoidal body having a longitudinal major axis with a nose end and a tail end, laterally extending planing members on each side of said major axis;
    a weight disposed within said body, said weight being situated near the nose end of said body, said weight establishing a center of gravity for said lure which is located between the geometric center of said major axis and said nose end;
    a dorsoventral rib mounted upon said body along said major axis, said rib comprising a pair of parallel plates separated to define a longitudinal slot therebetween, said slot having an open edge thereof facing upwardly, said slot extending along the upper side of said body substantially the entire length thereof, and attaching means for attaching a fishing line to said lure, said attaching means being located in said slot between said plates at a point intermediate the center of gravity of said lure and the nose end of said body whereby said fishing line will be disposed within said slot for guiding the direction of movement of said lure in the water.

* * * * *